United States Patent [19]

Mihic

[11] Patent Number: 5,388,936
[45] Date of Patent: Feb. 14, 1995

[54] TOOL HOLDER

[75] Inventor: Wlajko Mihic, Gävle, Sweden

[73] Assignee: Mircona AB, Gavle, Sweden

[21] Appl. No.: 157,013

[22] PCT Filed: May 19, 1992

[86] PCT No.: PCT/SE92/00332
§ 371 Date: Nov. 30, 1993
§ 102(e) Date: Nov. 30, 1993

[87] PCT Pub. No.: WO92/21464
PCT Pub. Date: Dec. 10, 1992

[30] Foreign Application Priority Data

Jun. 4, 1991 [SE] Sweden ................... 9101689

[51] Int. Cl.$^6$ ...................... B23C 9/00; B23B 31/00
[52] U.S. Cl. ...................... 409/234; 408/239 R
[58] Field of Search ............ 409/232, 233, 234, 230; 408/239 R, 238; 82/160; 403/292

[56] References Cited

U.S. PATENT DOCUMENTS

| | | | |
|---|---|---|---|
| 4,813,831 | 3/1989 | Reinauer | 409/232 |
| 4,913,607 | 4/1990 | Von Haas | 409/234 |
| 4,915,523 | 4/1990 | Andersson | 409/234 X |
| 5,040,931 | 8/1991 | Spivey et al. | 408/185 |
| 5,212,872 | 5/1993 | Spivey et al. | 33/558 |

FOREIGN PATENT DOCUMENTS

| | | | |
|---|---|---|---|
| 260883 | 10/1988 | Germany | 409/234 |
| 4005938 | 10/1990 | Germany | |
| 409832 | 9/1979 | Sweden | |
| 515094 | 12/1971 | Switzerland | |
| 2194474 | 3/1988 | United Kingdom | |

OTHER PUBLICATIONS

Derwent's abstract, No. 88-247936/35, SU 1 373 496, publ. week 8835 (LENGD PARGOLOVSK WK).

*Primary Examiner*—William Briggs
*Attorney, Agent, or Firm*—Ware, Fressola, Van Der Sluys & Adolphson

[57] ABSTRACT

The invention relates to a fastening device or mounting of a tool holder (2) at a mandrel (1) for a milling machine and the like or a rotatable holder for boring machine and the like. The mandrel (1) presents a central trunnion (4) having an axial threaded bore (6). The trunnion (4) is used as a support for a sleeve (9) which is slid over the trunnion (4) and presents an external circumferential V-groove (10). The sleeve (9) has, at its inner end, recesses (8) complementary to a wedge (5) of the mandrel (1). A fastening screw (16) is insertable in the axial threaded bore (6) and has a head (17) engaging the outer end face of the sleeve (9). The tool holder (2) has an opposite central opening on each side communicating with recesses (8) for the wedge. The portion of the tool holder (2) surrounding the sleeve (9) has a number of radial locking screws (13) with conical inner ends adapted to engage the V-groove (10) of the sleeve (9).

1 Claim, 1 Drawing Sheet

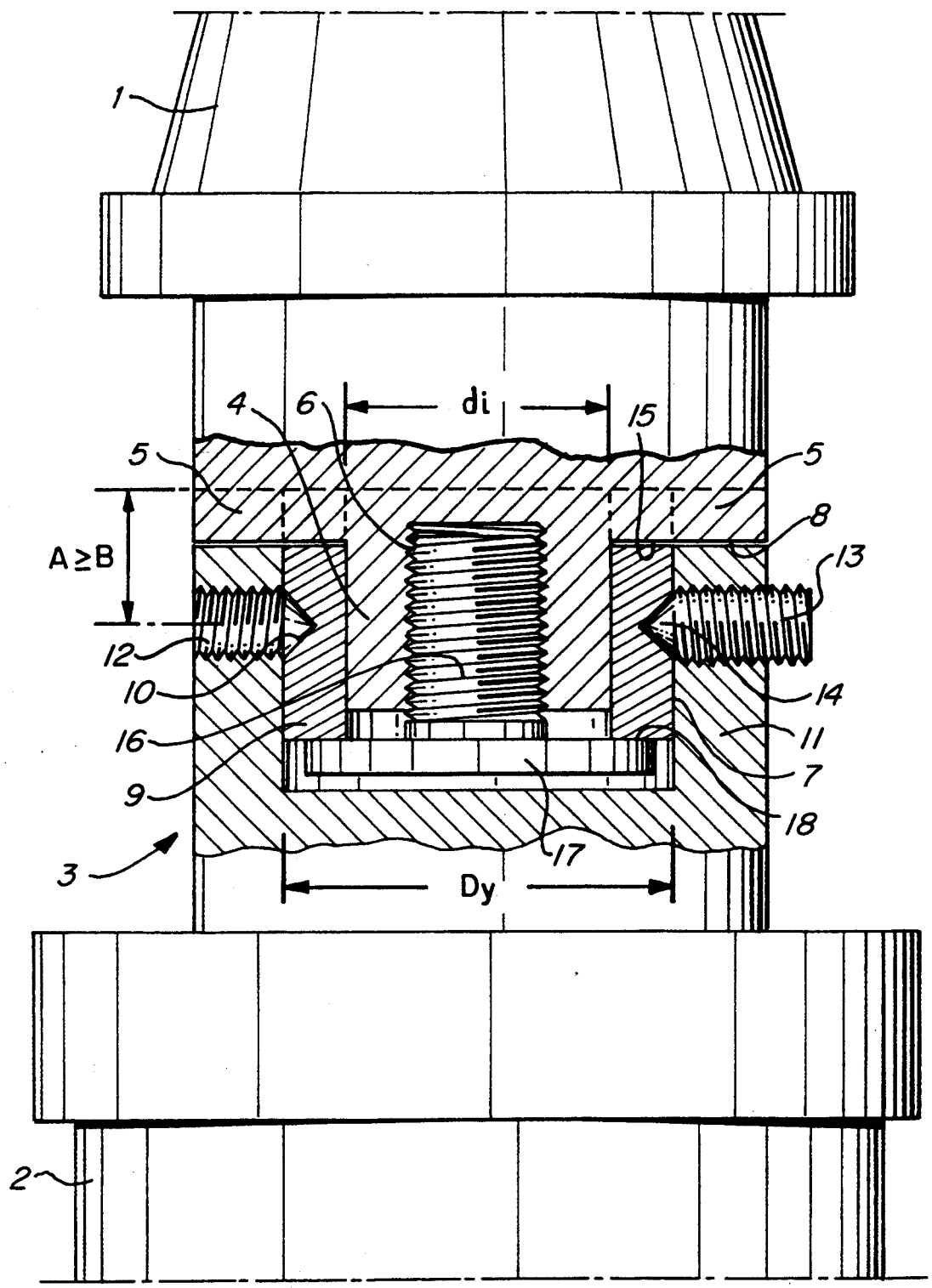

TOOL HOLDER

BACKGROUND OF THE INVENTION

1. Technical Field of the Invention

This invention relates to a fastening device for a machine tool such as for the fastening of a milling tool to a milling tool mandrel, or a rotatable carrier for boring or milling machines or the like.

2. Description of the Prior Art

SE,B, 409 832 discloses a device for the fastening of a tool holder wherein an axial screw is tightened rigidly in a bore of the center trunnion of the mandrel. The axial screw has a saucer like head with obliquely arranged lower side and serves as fastener for a tool holder pushed onto and over the trunnion and the axial screw. The device has radially arranged locking screws with conical ends displaceable to engage the obliquely arranged lower side of the head of the axial screw.

The intention behind the known device was to facilitate the changing of tools earlier performed by manipulating a locking screw accessible from the opposite end of the tool holder forcing same into and out from the threaded bore at the mandrel trunnion.

By utilizing a central holding screw having a saucer shaped head with an inwardly inclined inner side, the loosening and fastening operations are facilitated. However, by moving the area of engagement for the locking elements or screws so far away axially from the cooperating axial abutment faces, the stability is endangered. This especially occurs when the tool holder sleeve to be slided onto the mandrel trunnion is too short, as when different makers have different dimensions. The axially acting moment of the inclined surface engaging conical ends of the locking screws will be insufficient to press the sleeve with sufficient force against the abutment face of the mandrel especially when the points of the locking screws meet the axially oriented fastening screw shank. The locating of the locking screws outside the rigid and stable mandrel trunnion might result in heavy wear because of the leverage occurring between the tool holder and mandrel upon operation of the milling tool.

SUMMARY OF THE INVENTION

It has been noted that the axial dimension of the central trunnion of milling machine mandrels and the like deviate from the standard or given dimension and, even if the deviation is relatively seen very small, it might result in the tool holder not engaging the abutment face properly. Similarly, the sleeve portion of the tool holder oftentimes does not meet the standard or given dimension being either too long or too short axially. The drawbacks mentioned above concerning the known device is the more pronounced if also the dimensions of the cooperating parts are faulty. An object of this invention is to provide a fastening device which, independently of deviations from given dimensions, ensures a stable fastening.

The invention is based on a milling machine mandrel trunnion having a threaded central bore and this trunnion is used as support for a specific sleeve according to the invention. The sleeve has a circumferential V-groove and also, at its one end face, recesses adapted to the locking wedge of the mandrel. A fastening screw having an essentially flat disc like head is adapted to be threaded into the central trunnion bore until its head engages the outer end face of the sleeve pressing the sleeve inwardly towards the opposite facing end surface of the mandrel. The tool holder or the like has a central opening closely fitting onto the sleeve and, recesses at the inner end of the holder communicating with the recesses for the locking wedge of the mandrel. The tool holder body also presents three radially arranged threaded bores directed towards the center of the central opening for locking screws, each having a conical inner end. The screws being adapted to engage the V-groove of the sleeve secured onto the mandrel trunnion.

BRIEF DESCRIPTION OF THE DRAWING

One embodiment of the device according to the invention will be described in detail in the following with references to the attached drawing, which schematically and in a partial sectional view shows a portion of a milling machine mandrel and a portion of a tool holder with a fastening device according to the invention.

DETAILED DESCRIPTION OF THE PREFERRED EMBODIMENT

In the embodiment shown, a milling machine mandrel is designated by the numeral 1, a tool holder designated by the numeral 2 and the whole unit generally designated by the numeral 3.

At the one end of the mandrel 1 there is a central trunnion 4 and diametrically over the end face of the mandrel 1, there is a wedge means 5 having one section on each side of the trunnion 4. The trunnion 4 has a concentrically arranged threaded bore 6.

The tool holder 2 has at its one end a concentrically arranged cylindrical bore 7 and radially therefrom extends recesses 8 intended to cooperate with and engage the wedge means 5.

According to the invention, there is a cylindrical sleeve 9 having an inner diameter $d_i$ corresponding to the outer diameter of the central mandrel 4 and an outer diameter $d_y$ corresponding to the inner diameter of the cylindrical bore 7 of the tool holder 2. The outside of the sleeve 9 presents a circumferential V-groove 10 which is located a distance A from an end face of the mandrel 1 surrounding the trunnion 4.

A portion 11 of the tool holder 2 encloses the sleeve 9 and also the trunnion 4 and presents a number of threaded bores 12 for locking screws 13 (only one shown) having a conical end portion 14 thereon. Upon insertion, the screws 13 will engage groove 10 and thereby lock the sleeve 9 and tool holder 2 together.

The sleeve 9 is in turn connected to the mandrel 1 by the configuration related engagement between the sleeve 9 having recesses 15 complementary to the wedge 5 and the engagement between the outer face of the mandrel 1 or trunnion 4 and the inside of the sleeve 9. In axial direction, the sleeve 9 is connected to the mandrel 1 by the engagement of a tightening screw 16 having a specifically adapted head 17, the circumferential portion thereof engaging an end face 18 of the sleeve 9.

As can be seen, the axial length of the sleeve 9 is larger than the axial length of the trunnion 4. This ensures under all circumstances a stable and rigid mounting of the sleeve 9. The sleeve 9 has a length such that it accommodates even the largest deviations in length at the trunnion 4, thereby eliminating the risk that the screw head 17 will engage the end of the trunnion 4 before pressing the sleeve 9 completely or to desired extent towards the end face of the mandrel 1. This means that the dimension A, i.e. the axial distance from the end face of the mandrel 1 to the radial central plane of the V-groove 10, always is the same even if the mandrel 1 or trunnion 4 deviates from standard. It will be appreciated that a plurality of sleeves 9 can be provided in given and standardized outer diameter sizes $d_y$ adapted to the inner diameter of the tool holder 2. The diameter of the trunnion 4 of existing mandrels serves as a base value on determining the inner diameter di of the sleeve 9 and naturally also an individual machining may take place on site. As the dimension A is to be identical for all sleeves and tool holders, the fastening device may be used as fitting part and be changed between different tool holders and mandrels.

In order to reach a stable and rigid fastening, the point of each of the locking screws 13, upon insertion, has to meet the side of the V-groove 10 remote from the mandrel 1 in order to, on proceeding with the insertion, allow the conical screw ends, simultaneously as they move radially inwardly in the groove 10, to displace themselves and also the tool holder 2 upwardly towards the mandrel 1. In order to achieve this and the desired tightening force, the dimension A must be equal to or greater than the dimension B (the axial distance from the centerline of screws 13 and thread bores 12 and the end face of the tool holder portion 11), so that the points of the screws 13 are initially located further from the end face of the mandrel 1 than the center plane of the V-groove 10 of the sleeve 9 already secured to the end face of the mandrel 1 by means of the screw 16.

The invention is not limited to the embodiments shown above but can be varied within the framework of the following patent claims.

I claim:

1. In a machine tool having rotatable machine part such as a mandrel, the mandrel having a central protruding trunnion extending from an end face thereof and wedge means adjacent a root portion of the central trunnion, the central trunnion having an outer diameter and a threaded central bore, the improvement comprising (a) a cylindrical sleeve having a length at least equal to that of the central trunnion and including:
  (i) an inner diameter corresponding to the outer diameter of the central trunnion for mating reception thereof,
  (ii) an outer diameter,
  (iii) radial recesses at one end adapted to receive the wedge means of the mandrel,
  (iv) a radially circumferential, axially facing abutment surface at another end thereof, and
  (v) an externally circumferential essentially V-shaped groove defining a radial plane therethrough at a specified axial distance from the end face of the mandrel;
(b) a screw having a head adapted to engage said axially facing abutment surface of said sleeve and being threadingly insertable into the threaded central bore in the trunnion thereby pressing said sleeve against the end face of the mandrel surrounding the trunnion and establishing a rigid engagement between the mandrel and said sleeve;
(c) a tool holder having:
  (i) a hollow portion with a central opening having an inner diameter corresponding to said outer diameter of said sleeve for mating reception thereof,
  (ii) an end face defining lateral recesses adapted to cooperate with the wedge means, and
  (iii) a plurality of threaded bores extending radially in said hollow portion and communicating with said central opening; and
(d) a set screw arranged in each of said plurality of threaded radial bores of said hollow portion of said tool holder, said set screws have conical inner ends arranged upon tightening to engage both sides of said V-shaped groove of said sleeve in order to position said tool holder in both axial directions, said set screws being arranged at an axial distance from said end face of said tool holder closely corresponding to said specified axial distance between said radial plane of said V-shaped groove and the end face of the mandrel.

* * * * *